Figure 1:
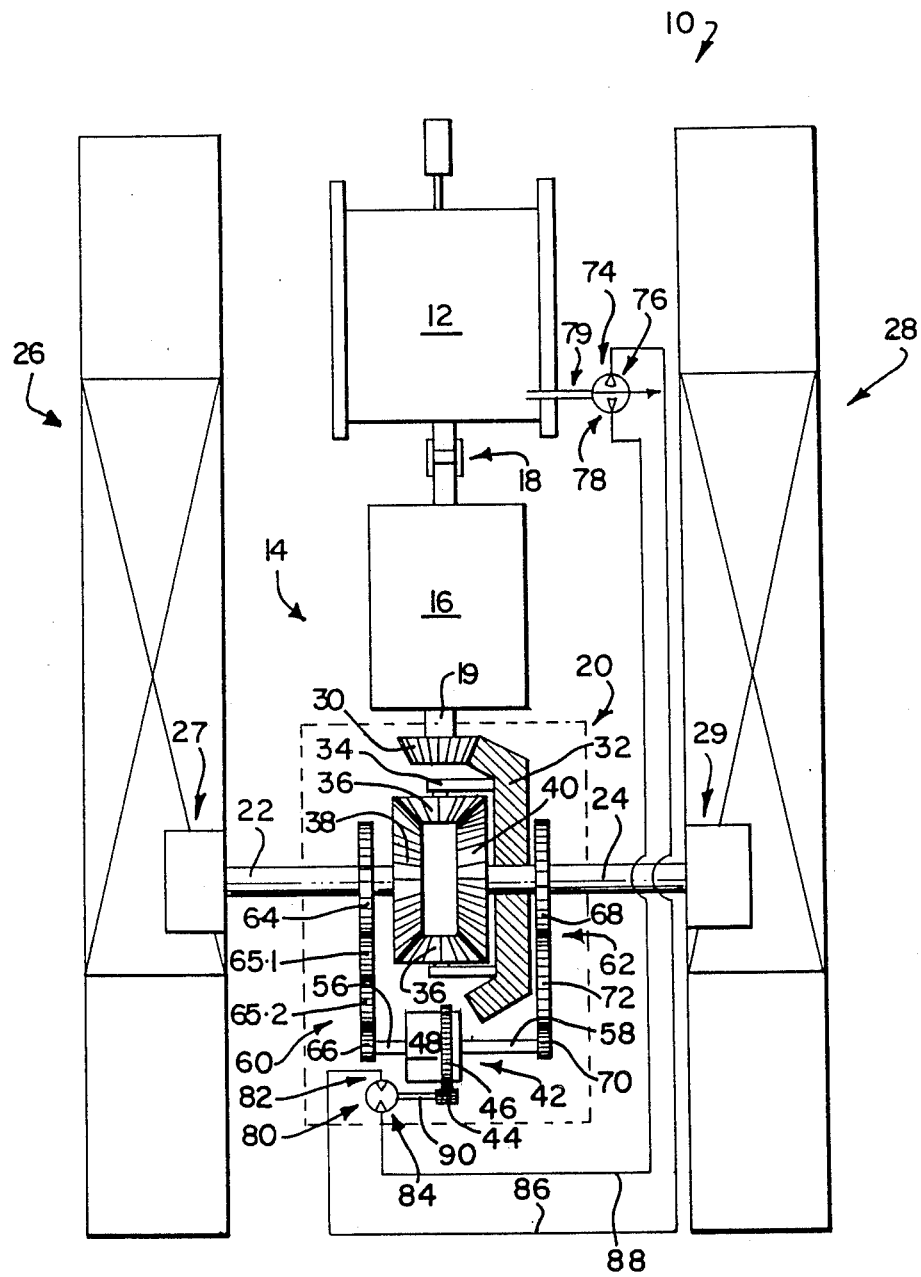

United States Patent [19]

Barnard

[11] Patent Number: 4,882,947
[45] Date of Patent: Nov. 28, 1989

[54] TRACK-LAYING DEVICE

[76] Inventor: Jan H. Barnard, Sec. 90 of Sec.77, Wildebeesthoek, 310 JR, Pretoria, South Africa

[21] Appl. No.: 307,203

[22] Filed: Feb. 6, 1989

Related U.S. Application Data

[63] Continuation of Ser. No. 165,389, Feb. 29, 1988, abandoned, which is a continuation of Ser. No. 931,027, Nov. 17, 1986, abandoned.

[30] Foreign Application Priority Data

Jan. 29, 1986 [ZA] South Africa .................. 86/0678

[51] Int. Cl.⁴ ............................................. F16H 47/04
[52] U.S. Cl. .................................. 74/687; 74/720; 74/714; 180/6.44
[58] Field of Search ............... 74/687, 677, 679, 681, 74/700, 714, 718, 720, 720.5; 180/6.44

[56] References Cited

U.S. PATENT DOCUMENTS

| | | | |
|---|---|---|---|
| 1,128,818 | 2/1915 | Remy et al. ............. | 74/720.5 X |
| 1,352,269 | 9/1920 | Indahl .................... | 74/714 |
| 1,401,221 | 12/1921 | White .................... | 74/720.5 |
| 1,797,797 | 3/1931 | Saives ................... | 74/720.5 X |
| 1,872,541 | 8/1932 | White .................... | 74/720.5 X |
| 2,336,911 | 12/1943 | Zimmerman ............ | 74/687 |
| 2,336,912 | 12/1943 | Zimmerman ............ | 74/687 |
| 2,391,735 | 12/1945 | Orshansky ............. | 74/687 X |
| 2,393,557 | 1/1946 | Orshansky ............. | 74/687 |
| 2,400,728 | 5/1946 | Akers ................... | 74/710.5 |
| 2,730,182 | 1/1956 | Sloane .................. | 180/6.44 |
| 2,780,299 | 2/1957 | Matson ................. | 180/6.28 |
| 2,874,591 | 2/1959 | Thoma .................. | 74/687 |
| 2,946,239 | 7/1960 | Hait ..................... | 74/710.5 |
| 3,580,107 | 5/1971 | Orshansky ............ | 74/687 |
| 3,768,336 | 10/1973 | Wharton ............... | 74/714 |

FOREIGN PATENT DOCUMENTS

81/00240 2/1981 PCT Int'l Appl. .
85/01784 4/1985 PCT Int'l Appl. .
2034831 6/1980 United Kingdom .

*Primary Examiner*—Dirk Wright
*Attorney, Agent, or Firm*—Browdy and Neimark

[57] ABSTRACT

A track laying vehicle has a drive motor, a transmission including a gear box, a transmission differential gear, and a pair of tracks; all of which are drivingly interconnected. The vehicle includes direction control means for controlling the relative speeds of half shafts of the differential gear. The direction control means comprises a control differential gear, half shafts which are drivingly connected to the half shafts of the transmission differential; a hydraulic, axial piston, variable displacement pump having inputs/outputs, a hydraulic, axial piston, variable or fixed displacement motor having inputs/outputs. The inputs/outputs of the pump and motor are respectively communicated. The motor is drivingly connected to an input gear of the control differential gear. One each of the half shafts of the transmission and control differentials are interconnected for opposed rotation at a specific speed ratio. The other half shafts are interconnected for rotation in the same direction at said specific speed ratio. Interconnection of the respective half shafts are upstream of final epicyclic reduction gears.

21 Claims, 2 Drawing Sheets

TRACK-LAYING DEVICE

This application is a continuation of application Ser. No. 165,389, filed Feb. 29, 1988, now abandoned, which itself is a continuation of application Ser. No. 931,027, filed Nov. 17, 1986, now abandoned.

This invention relates to a vehicle, having laterally spaced drive elements such as wheels or tracks and a transmission including a differential gear drivingly connecting said drive elements to a motor of the vehicle, and which kind of vehicle is normally prone to unstable steering, also referred to as self steering. The invention relates more specifically to the combination of a transmission and direction control means suitable for use with a vehicle as described to effect stable steering and to resist unstable steering.

In vehicles of the kind described capable of high speeds, such as battle tanks, articulated vehicles, some agricultural tractors, and the like, it is important to counter any undesirable change in resistance the drive elements encounter to resist unstable steering. During high speed operation manual corrective action is not possible due to too long a time lag in responding.

The field of the invention, and more specifically as applied to battle tanks, has attracted the attention of inventors over a long period of time.

Systems capable of effecting steering in track laying vehicles can be placed broadly in two categories, namely mechanical systems, and hydrostatic systems. A later development is a hybrid system, making use of a combination of a mechanical system and a hydrostatic system.

Turning a track laying vehicle is performed by slowing or stopping or reversing the track on one side of the vehicle and increasing the speed of the track on the other side. This results in a slewing couple about the vehicle centre so that a negative force arises at the inner track and a positive force at the outer track, these forces being about equal in magnitude and opposite in direction. It is to be borne in mind that the positive force applied to the outer track is in addition to the force already applied for forward propulsion. In terms of power at high vehicle speeds, the additional force can be several times that available from the engine. In order to sustain the turn without slowing the vehicle's forward speed, power applied by the sub surface to the inner track must be transmitted to the outer track as efficiently as possible. This is referred to as "regeneration". As stated above, this power is large 13 potentially several times the engine power. The efficient transmission of this power lies at the heart of the problem addressed by inventors in this field.

The best known mechanical system is known as the Merrit triple-differential system. This system utilizes braking of the inner track to effect steering. The vehicle steers in a series of polygonal paths, sometimes referred to as "twitching", approximating a radius of steer. In practice, in order to approximate a true radius of steer, the steer brakes are allowed to slip with a consequential high loss of power through heat generation.

All mechanical systems utilize disc, band or clutch brakes and all suffer from two disadvantages. First, regeneration does not take place, thus forward motion of the vehicle is slowed down. Second, the negative power of the sub-surface on the inner track is dissipated as heat giving rise to heat dissipation problems in the brakes.

Two approaches have so far been utilized in hydrostatic systems.

The first is known as a null shaft steering system. A null shaft engages sun wheels of output epicyclic gears respectively by means of an even and an uneven gear train. To effect steer, the null shaft is driven suitably by means of a hydraulic motor thereby to cause the sun wheels to rotate at equal speeds in opposite directions. Thus, the inner track is slowed down and the outer track is speeded up. Regeneration power is transmitted via a secondary shaft connecting annuli of the epicyclic gears. The null shaft steering system suffers from a high power loss at the point of minimum geared and pivot turn radius, and elsewhere in its range from running below rated capacity. Furthermore, systems utilizing a null shaft, all suffer from the disadvantage that the null shaft couples at the slow rotational speed/high torque zone of the vehicle. The null shaft is coupled internal to the final reduction gears nearest to the driven tracks. The high torque values require large, heavy shafts, gears and gearboxes with correspondingly large, heavy hydrostatic transmission units for its control. Those systems are thus large, clumsy, heavy and expensive. Resultingly, these systems are too costly and too heavy for application on agricultural tractors where an important or even main aim is to reduce soil compaction by the use of resilient tracks having exceptionally low specific pressure on the ground. In spite of these difficulties, the null shaft steering system is widely in use, on account of the absence, hitherto, of a better system.

Improvement in efficiency of the null shaft steering system is known in which a "shunt" is formed around the hydrostatic transmission by the use of gears and clutches. This is, however, at the expense of increased complexity.

A hybrid system has been proposed making use of a combination of a mechanical system and a hydrostatic system. The mechanical system, mainly, is used during slow speed, tight turns, and the hydrostatic system, mainly, is used to effect smooth, large radius, steers at high speeds. The disadvantage of the hybrid system is that of duplication.

It is an object of this invention to provide direction control means suitable for use with a vehicle of the kind described capable of high speeds to effect stable steering and to resist unstable or self steering, and which has advantages over known systems or at least offers a viable alternative to any known system, with emphasis on simplicity and low cost. It is a further object to provide direction control means of the kind described suitable for use with a track laying tractor to render such tractor capable of relatively high speeds and yet of relatively light mass as dictated by modern agricultural techniques, and at a cost which is viable in the field of agriculture.

In accordance with the invention, broadly, there is provided, in combination, a transmission a nd direction control means suitable for use with a vehicle having laterally spaced drive element, the transmission being arranged to transmit drive from a drive motor of the vehicle to the drive elements of the vehicle, and including a transmission differential gear having an input which is drivingly connectable to the drive motor, and a pair of half shafts which are respectively driving connectable to the drive elements;

the direction control means being adapted to control the speeds of said half shafts relative to each other and including a control differential gear having gear wheels in the form of spur gear wheels, each of which is rotatingly supported at either side, the control differential gear including a control input drivingly connected to a spur gear wheel fast with a cage of the control differential gear, and a pair of control half shafts, first connecting means interconnecting one of the half shafts of each of the differential gear and the control differential gear for rotation in opposite directions and at a predetermined speed ratio, second connecting means connecting the other of the half shafts of each of the transmission differential gear and the control differential gear for rotation in the same direction and at a speed ratio similar to said predetermined speed ratio, and steer drive means adapted selectively to hold the control input stationary and to drive the control input in a desired direction and at a desired speed.

In accordance with the invention, more specifically, there is provided, in combination, a transmission and direction control means suitable for use with a vehicle having laterally spaced drive elements, the transmission being arranged to transmit drive from a drive motor of the vehicle to the drive elements of the vehicle, and including a transmission differential gear having an input which is drivingly connectable to the drive motor, and a pair of half shafts which are respectively drivingly connectable to the drive elements;

the direction control means being adapted to control the speeds of said half shafts relative to each other and including a control differential gear comprising
  a cage,
  an input spur gear wheel fast with the cage,
  a pair of co-axial, outwardly extending, half shafts providing control half shafts,
  a pair of half shaft spur gear wheels respectively fast with said control half shafts at their inner ends,
  at least a first pair of spur pinions mounted for rotation on the cage at circumferentially spaced positions on a pitch circle about the axis of the half shaft spur gear wheels, the pitch circle diameter corresponding to the sum of the spur pinions, the circumferential spacing corresponding to the sum of the effective radii of the spur pinions, the arrangement being such that the spur pinions mesh respectively with the half shaft spur gears, and with each other;

first connecting means interconnecting one of the half shafts of each of the differential gear and the control differential gear for rotation in opposite directions and at a predetermined speed ratio;

second connecting means connecting the other of the half shafts of each of the transmission differential gear and the control differential gear for rotation in the same direction and at a speed ratio similar to said predetermined speed ratio;

a control input drivingly connected to the input spur gear wheel; and control drive means adapted selectively to hold the control input stationary and to drive the control input in a desired direction and at a desired speed.

It is to be appreciated that, during straight travel of the vehicle in use, the transmission half shafts are driven at equal speed in the same direction of rotation;

the control half shafts are driven respectively via the first and second connecting means at equal speed in opposite directions of rotation; and the control input is held stationary.

Thus, during such straight travel, the cage of the control differential gear is stationary and its pinions are spinning at full speed and are not orbiting.

To steer the vehicle, the control input is rotated at a desired speed (which will be relatively slow when the vehicle is moving fast) and in a desired direction, thus rotating the input spur gear and cage and orbiting the spur pinions correspondingly. The rotation speeds of the control half shafts are respectively increased and decreased which respectively increase and decreases the speeds of the transmission half shafts of the transmission differential gear to steer the vehicle. Thus, the direction of steer is selected by selecting the direction of rotation of the control input and the intensity of the steer is selected by selecting the speed of rotation of the control input.

When differential resistance is encounterd by the tracks of the vehicle during travel, such as when an obstacle is encountered by only one of the drive elements, said one drive element tends to decrease in speed and the other drive element to increase in speed correspondingly owing to differential operation of the differential gear. The tendency to change is transmitted from the transmission half shafts via the first and second connecting means to the control differential gear resulting in a tendency to change in the control input. If the control input is controlled to resist the tendency to change, the tendency toward unstable or self steering is resisted. It is to be appreciated that the drive elements and the control input are mechanically interconnected as herein described, and response to the tendency toward unstable steering is instantaneous.

Preferably, the control differential gear includes also a second pair of spur pinions identical to, and disposed in similar arrangement diametrically opposite to, said first pair of spur pinions, to facilitate balancing. Preferably, each spur pinion is rotatingly supported at either side thereof. Each spur pinion may be fast to or integral with a shaft via which it is rotatingly supported, the shaft being hollow. The shaft may have an outer diameter only slightly less than a root diameter of the pinion. The shaft may be relatively thin-walled. This will enhance strength and resilience and will reduce inertia.

The cage may be round and the input spur gear may be in the form of a ring gear or annulus around the cage.

The control drive means may be adapted for operation by means of incompressible hydraulic fluid, the control drive means including a hydraulic, axial piston, variable displacement pump having a pair of inlets/outlets, a hydraulic, axial piston motor having a pair of inlets/outlets respectively connected to the inlets/outlets of the pump, the pump having control means whereby it can be adjusted, the pump being drivingly connected to a drive motor and the hydraulic motor being drivingly connected to the control input, the pump being adapted for selective adjustment for delivery in a desired direction and at a desired output including zero delivery.

For zero delivery, a swash plate of the pump is adjusted at zero angle. For delivery , the swash plate is adjusted to slant in a direction corresponding to a desired direction of flow and at an angle corresponding to a desired rate of flow. The hydraulic motor is driven and in turn drives the control input in response to the pump. The hydraulic motor may be a variable displacement or fixed displacement piston motor.

Thus, for straight travel, the pump is adjusted for zero delivery resulting in the hydraulic motor and also the control input being held stationary. To steer, the pump is adjusted to deliver in a desired direction and at a desired rate, thus driving the hydraulic motor and also the control input correspondingly.

It is to be appreciated that any tendency toward unstable or self steer, which is transmitted to the control input as described above, is transmitted to the hydraulic motor and thence (in the form of a pressure differential in hydraulic pressure lines interconnecting the inputs/outputs of the pump and hydraulic motor) to the pump which resists such tendency and which preserves the condition quo of the hydraulic motor and thus also of the control input.

Conveniently, driving connection between the hydraulic motor and the control input may include a worm gear. The speed ratio of the worm gear may be such that it is irreversible, i.e. the speed ratio of the worm gear may be at least 6:1 preferably about 10:1. Therefore, when any tendency toward unstable or self steer is encountered, the worm gear prevents reverse drive and thus also any pressure pulses in hydraulic lines interconnecting the hydraulic motor and the hydraulic pump.

Torque associated with regeneration is transmitted from the inner track via the control differential to the outer track.

Figure 2:
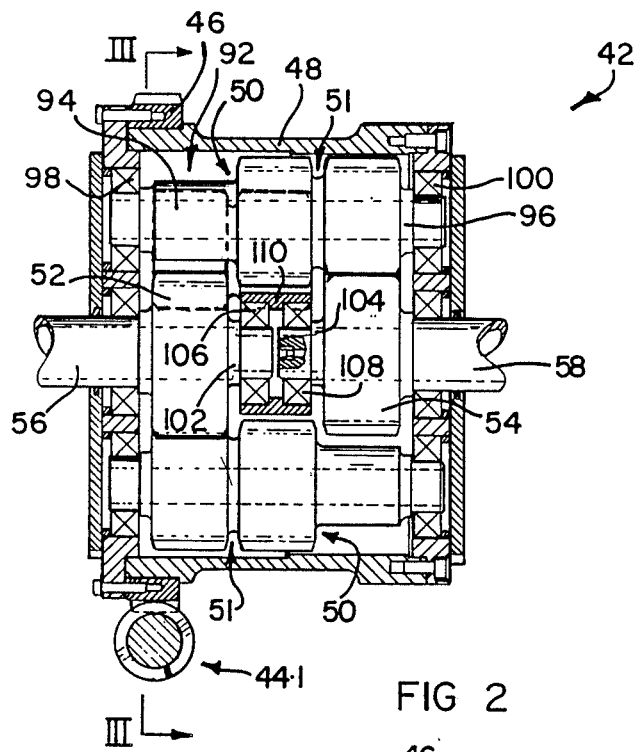
Figure 3:
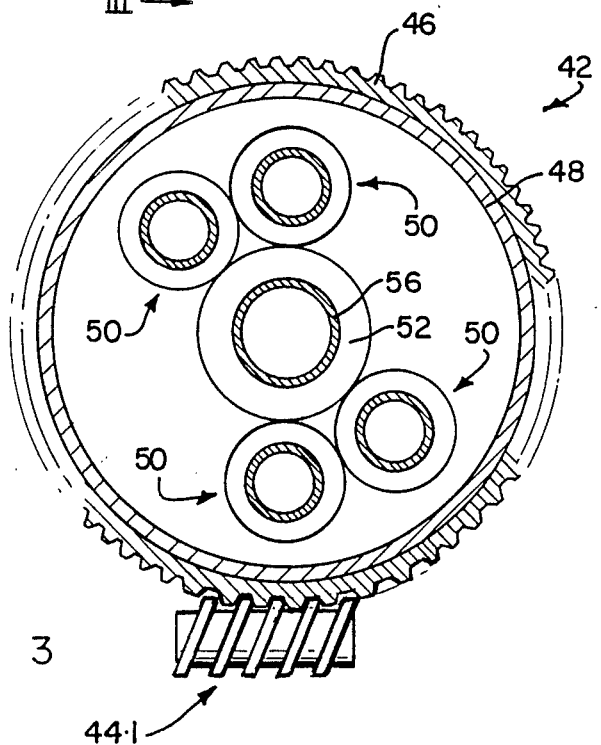

The invention is now described by way of example with reference to the accompanying diagrammatic drawings. In the drawings FIG. 1 shows, schematically in plan view, a track laying vehicle in accordance with the invention;

FIG. 2 shows, schematically in sectional side view, a control differential gear of the track laying vehicle of FIG. 1; and FIG. 3 shows an axial section taken at III—III in FIG. 2.

With reference to the drawings, a track laying vehicle in accordance with the invention is generally indicated by reference numeral 10. The track laying vehicle includes a diesel drive motor 12 and a transmission generally indicated at 14 adapted to transmit drive of the drive motor 12 to tracks 26, 28 of the track laying vehicle 10.

The transmission 14 includes a gear box 16 which is drivingly connected to the drive motor 12 by means of a coupling 18. The gear box 16 has an output in the form of a drive shaft 19.

The transmission 14 further includes a transmission differential gear 20 drivingly connected to the drive shaft 19 and having outputs in the form of co-axial half shafts 22, 24 projecting transversely from a casing of the transmission differential gear. The half shafts 22, 24 are drivingly connected via final reduction epicyclic gears 27, 29 to the tracks 26, 28 to drive the track laying vehicle 10. On account of the final reduction gears 27, 29, the half shafts 22, 24 operate at relatively high rotational speeds and thus at correspondingly low torque. The null shaft system couples at the low speed/high torque end of the transmission necessitating bulky, expensive, components. In contrast, the system disclosed in accordance with this invention, utilizes comparatively light, inexpensive components.

The transmission differential gear 20 is of conventional design and includes an input bevel pinion 30 fast with the drive shaft 19 at a rear end thereof. A crown wheel 32 is arranged co-axially with the half shaft 22, 24 to one side of the differential gear 20 and meshes with the pinon 30. The crown wheel 32 carries a cage 34 on which several bevel pinions 36 (two of which are shown) are mounted for rotation. The bevel pinions 36 mesh with complemental bevel gears 38, 40 respectively fast with the half shafts 22, 24 at their inner ends.

The track laying vehicle 10 further includes control means for controlling the relative speeds of the half shafts 22, 24. The control means includes a control differential gear 42 which is of special design. The control differential gear 42 is adapted for high speed operation and is substantially smaller than the transmission differential gear 20. It is described in detail with reference to FIGS. 2 and 3 below.

The control differential gear 42 has an input ring gear 46 mounted over a circular cage 48. It has a pair of half shafts 56, 58 mounting spur gears 52 and 54 at their inner ends within the cage 48. The half shafts 56, 58 are supported in roller bearings in the cage 48.

Spur pinions 50 are provided in two identical pairs in diametrically opposed arrangement to enhance the balance of the differential gear 42. The spur pinions 50 are all arranged on a pitch circle about the axis of the half shafts 56, 58. The diameter of the pitch circle corresponds to the effective combined diameter of the spur gear 52 or 54 and a spur pinion 50. Thus, all of the spur pinions 50 mesh with either the spur gear 52 or the spur gear 54. The spur pinions 50 of each pair are circumferentially spaced a distance corresponding to their combined radii. Thus, the pinions of each pair mesh also with each other.

In FIG. 2 it can be seen that each spur pinion 50 is substantially double the width of the spur gears 52, 54. In each pair, the spur pinions are arranged toward differenct sides of the cage 48 so that they mesh respectively with the spur gears 52, 54 and with each other in a space intermediate the spur gears 52, 54.

To accommodate the double meshing of each spur pinion 50, it has a circumferential oil groove 51 dividing it into two cogged portions.

With reference more specifically to FIG. 1, the control means further includes first connection means generally indicated at 60 and interconnecting the half shaft 22 of the transmission differential gear 20 and the half shaft 56 of the control differential gear 42. Driving connection is by means of a spur gear 64 fast with the half shaft 22, a spur pinion 66 fast with the half shaft 56 and a pair of idler gear 64 and spur pinion 66 to form a gear train. The idler gears are provided to accommodate the spacing between the half shafts 22, 56 while maintaining the diameters of the spur gear 64 and spur pinion 66 relatively small. The gear ratio of the first connection means 60 is about 6 to 1 and it is adapted to interconnect the half shafts 22, 56 to rotate in opposite directions.

The control means includes also second connection means 62 including a spur gear 68 fast with the half shaft 24 and a spur pinion 70 fast with the half shaft 58, and further an idler gear 62 interposed between the spur gears 68 and the spur pinion 70 to form a gear train interconnecting the half shafts 24 and 58 for rotation in the same direction. The gear ratio of the spur gear 68 and the spur pinion 70 is identical to that of the first connection means 60. Thus, when the half shafts 22 and 24 rotate in the same direction at equal speed, the half shafts 56 and 58 will rotate at equal speed in opposite directions.

On account of the gear ratio substantially larger than 1:1, the control half shafts operate at relatively high rotational speeds and correspondingly low torque, thus reducing cost and mass.

The control means further includes an axial piston, variable displacement hydraulic pump 74 having a pair of inputs/outputs 76, 78. The pump 74 is driven from the drive motor 12 as indicated at 79. A swash plate of the pump is in use controlled by an operator of the vehicle in respect of direction and rate of delivery.

The control means further includes a hydraulic, variable or fixed displacement, axial piston motor 80 having a pair of inputs/outputs 82,84. A pair of hydraulic pressure lines 88, 86 interconnect respectively the inputs/outputs 84, 78; and the inputs/outputs 82, 76. The hydraulic motor 80 has an output drive shaft 90 mounting an input spur pinion 44 of the control differential gear 42. The pump 74, hydraulic motor 80 and pressure lines 86, 88 form a closed hydraulic circuit which is automaticallyo kept filled to capacity with imcompressible hydraulic fluid.

The pump 74 can selectively be controlled by adjustment of its swash plate to deliver hydraulic fluid in a desired direction and at a desired flow rate. The pump 74 can also be adjusted to have zero delivery. At such an adjustment it acts as a closed valve between the hydraulic pressure lines 86,88.

The hydraulic motor 80 is driven in response to the output of the pump 74. It can thus be driven in a desired direction corresponding to the direction of pumping of the pump 74 and at a desired speed corresponding to the output of the pump 74.

As described hereinbefore, when the track laying vehicle 10 travels in a straight line, the tracks 26, 28 travel in the same direction and at equal speed. The half shafts 22, 24 correspondingly rotate in the same direction and at equal speed. Correspondingly, the bevel pinions 36 do not spin and orbit at full speed together with the crown wheel 32. The spur gears 64 and 68 rotate with the half shafts 22, 24.

In response to rotation of the spur gears 64, 68, the spur pinions 66, 70 rotate at equal speed and in opposite directions. Thus, in the control differential gear 42 the spur pinions 50 spin at full speed and zero drive load, and do not orbit. Thus, the ring gear 46, the spur pinion 44 and the hydraulic motor 80 are stationary. There is no flow in the hydraulic pressure lines 86, 88 and the pump 74 is adjusted for zero delivery. It thus acts as a closed valve in the hydraulic pressure lines 86, 88.

Should asymmetrical resistance be encountered by the vehicle 10 (e.g. when the tracks 26, 28 encounter unequal resistance), one of the tracks 26, 28 will tend to slow down while, owing to the differential operation of the transmission differential gear 20, the other track will tend to speed up. This is the so-called unstable steer or self steer tendency of a track laying vehicle. The tendency to change is transmitted by the spur gear 64, 68 and spur pinions 66, 70 to the control differential gear 42. This tendency will tend to rotate the ring gear 46, the spur pinion 44 and the hydraulic motor 80 which will tend to operate as a pump. However, because of the closed valve action of the pump 74, the hydraulic motor 80 cannot pump hydraulic fluid through the hydraulic pressure lines 86, 88 and is thus forced to remain stationary thus resisting the tendency to change or the tendency to unstable or self steer. The net result of such a self-steer tendency is that the pressure in one of the hydraulic pressure lines 86, 88 will rise.

Similarly, should asymmetrical resistance be encountered during selective steering of the vehicle, the tendency to change will be resisted by the hydraulic motor 80 which will remain operating at a speed and in a direction dictated by the pump 74 and will thus, via corresponding pressure changes in the hydraulic lines 86, 88 resist any tendency to change.

The control motor drive 44, 46 illustrated in FIG. 1, allows drive line losses at the track to be measured as a function of steering reaction pressure. For practical operation, by way of development, driving connection between the motor 80 and the control differential gear 42 may be via a worm gear 44.1 (FIGS. 2 and 3) having a speed reducing ratio such that it is irreversible, e.g. a speed ratio of at least about 6:1. Then, in the case of any tendency toward unstable or self steer, torque cannot be transmitted from the control differential gear 42 to the motor 80. Thus, not even the pressure pulses referred to above will be generated. When a worm gear having a speed ratio lower than 6:1, is used, any pressure pulses will be attenuated. A multi-start worm and cogged wheel system of a ratio of about 10:1 is proposed.

For selective steering, the pump 74 is adjusted in respect of direction of pumping corresponding to the direction of steering, and in respect of output corresponding to the intensity of steering. The hydraulic motor 80 responds by rotating the spur pinion 44 (worm 44.1) in the desired direction at the desired speed. The control differential gear 42 responds by changing the relative speeds of the half shafts 56, 58 which change is transmitted via the first and second connecting means 60,62 to the half shafts 22, 24 causing one to slow down and the other to speed up, thus inducing steer.

During selective steering, a change in the relative speeds of the tracks takes place. The inner track slows down and is subject to negative force transmitted from the sub-surface to the track. This negative force is transmitted as negative torque via the control differential on account of differential action as positive torque to the outer track and as positive pressure to the sub-surface. Thus regeneration takes place via the control differential. It is to be appreciated that differential action is ensured in that no change is permitted in the control input, as described above.

As herein described, it is to be appreciated that the control differential gear 42 will operate under conditions vastly different to those of a convention differential gear. Thus, during straight travel, the spur pinions 50 spin at full speed and do not orbit. Conventional differential gears are not suitable for this kind of operation especially as the control differential gear operates at substantially higher speeds than conventional differential gears due to the speed ratio of the first and second connecting means. Furthermore, in order to couple the control differential system inwardly (upstream) of the final reduction gears with a view to reducing the size, mass and cast of the control system, a sturdy differential design, in comparison to existing systems, was generated from the point of view of strength, size and mass. These advantages are beneficial for applications in the military field, and allow this invention to be applied to agriculture. Thus, a differential gear utilizing spur gears instead of bevel gears is disclosed. The spur gears can more easily be manufactured bearing the expected operating conditions in mind.

Each of the spur pinions 50, is integral with or fixed to a shaft 92 extending at either side of the spur pinion to provide stubs 94, 96. The stubs 94, 96 of each shaft 94 are respectively rotatingly supported in bearings 98, 100 in the cage 48. Thus, each spur pinion 50 is rotatingly supported at either side as opposed to the cantilever arrangement of the bevel pinions of conventional differential gears.

In addition, the shafts 92 are of large diameter, this walled, hollow construction. This enables the bearings 98, 100 to be large and of large load bearing capacity. Also, it enables the spur pinions to be of relatively light mass thus limiting inertia and centrifugal forces. Furthermore, it enhances resilience, and thus the capacity to absorb shock loads, of the control differential gear.

Similarly, the half shafts 56, 58 are shown to be of relatively large diameter, this walled, hollow construction affording similar advantages. However, if desired, the half shafts 56, 58 need not be of such relatively large diameter, hollow construction, but may be of smaller diameter, solid construction. Furthermore, the half shafts 56, 58 are inwardly extended in the form of stubs 102, 104 which are rotatingly supported in bearings 106, 108 mounted in an inboard floating sleeve 110 which integrates the half shafts 56, 58 in respect of flexing.

Thus the use of spur gears in the control differential gear enables the spur gears to be rotatingly supported at either side to enhance their load carrying capacity. The use of large diameter, thin walled, hollow shafts further enhances the load carrying capacity and resilience with little or no penalty in the form of added inertia. These features enable the power associated with regeneration during turning discussed above to be transmitted from an inner track to an outer track without using complex, expensive, and large devices such as a null shaft, a shunt arrangement around the steering control system and the like. Proto-type performance tests showed that 90° corners can be negotiated at a speed of 22 km/h (about 14 mph) without any harm to the control system.

The designers of double and triple differential systems experienced difficulties with the use of a control differential having bevelled gears, the planetary gears of which are mounted on cantilever shafts. Such systems cannot cope with high torque associated with regeneration, i.e. torque transmitted from an inner to an outer track. The difficulties are twofold, namely, first, the cantilever shafts' not being able to cope with reaction forces between meshing cogs, and, second, the bevelled configuration of the gears giving rise to relatively thin, closely spaced cogs toward the insides of the gears owing to the diminishing effective diameter of the bevelled gears.

A differential system with bevelled planet pinions rotatable on interlinked, cross configured, dead shafts is a ]theoretical possibility but, in practice, difficulty is experienced with aligning the panel assembly and also with subsequent misalignment due to warping when residual stress is sometimes relieved during operation. Such a system will not alleviate the second difficulty, mentioned above, associated with the bevelled configuration of the pinions.

The Inventor proposes mounting the control differential gear directly above the gears of a transmission differential gear in the same casing. This is proposed to be done by elevating a cover of the transmission differential gear casing and interposing between the cover and the rest of the casing a peripheral insert having a height to accommodate the control differential gear.

Furthermore, the first and second connecting means are proposed to be accommodated with the casing of the transmission different gear. Should be casing of the transmission differential gear not allow enough space to do this, sides of the casing can be built out to allow this.

It is an advantage that the size, mass and cost of the transmission differential gear 20 and that of the control differential gear 42 are reduced by having the final drives 27, 29, which allow the speed of the half shafts 22, 24 to be increased, and the torque capacity and size of the differential gears to be decreased.

It is a further advantage for agricultural applications that the system in accordance with the invention affords the same advantages as a conventional differential lock system, e.g. it prevents one drive element (wheel or track), on slipping slightly due to over torque, from "running away" uncontrollably, thus utilizing all of the engine power and digging in. In addition, whereas a conventional differential lock system can be used only during straight travel, the system in accordance with the invention operates permanently, i.e. also in turns and even when working contours.

I claim:

1. In combination, a transmission and direction control means suitable for use with a vehicle having laterally spaced drive elements and adapted to transmit drive from a drive from a drive motor of the vehicle to the drive elements of the vehicle, comprising:

a transmission differential gear substantially on a longitudinal vertical line of the vehicle, and having an input which is drivingly connectable to the drive motor, and a pair of half shafts which are respectively drivingly connectable to the drive elements;

a control differential gear substantially on said vertical plane and comprising a cage, an input spur gear wheel fast with the cage, a pair of co-axial, outwardly extending, half shafts providing control half shafts, a pair of half shaft spur gear wheels respectively fast with said control half shafts at their inner ends, and at least a first pair of spur pinions mounted for rotation on the cage at circumferentially spaced positions on a pitch circle about the axis of the half shaft spur gear wheels, the pitch circle diameter corresponding to the sum of the effective diameters of the half shaft spur gear wheels and the spur pinions, the circumferential spacing corresponding to the sum of the effective radii of the spur pinions, the arrangement being such that the spur pinions mesh respectively with the half shaft spur gears, and with each other;

first connecting means interconnecting the half shafts of each of the differential gear and the control differential gear for rotation in opposite directions and at a predetermined ratio of speed of the half shaft of the control differential gear to speed of the half shaft of the transmission differential gear larger than 1:1;

second connecting means connecting the other of the half shafts of each of the transmission differential gear and the control differential gear for rotation in the same direction and at a speed ratio similar to said predetermined speed ratio;

a control input drivingly connected to the input spur gear wheel; and control drive means adapted selectively to hold the control input stationary and to drive the control input in a desired direction and a desired speed.

2. Apparatus as claimed in claim 1, in which each spur pinion is rotatingly supported at either side thereof and is fast to or integral with a shaft via which it is rotatingly supported, the shaft being hollow.

3. Apparatus as claimed in claim 2, in which the shaft has an outer diameter only slightly less than a root diameter of the pinion.

4. Apparatus as claimed in claim 1, in which the control drive means is adapted for operation by means of incompressible hydraulic fluid, the control drive means including a hydraulic, axial piston, variable displacement pump having a pair of inlets/outlets, a hydraulic, axial piston motor having a pair of inlet/outlets respectively connected to the inlet/outlets of the pump, the pump having control means for adjusting the pump, the pump being drivingly connected to the drive motor and the hydraulic motor being drivingly connected to the control input, the pump being adapted for selective adjustment for delivery in a desired direction and at a desired output including zero delivery.

5. Apparatus as claimed in claim 4, further comprising a worm gear for providing driving connection between the hydraulic motor and the control input.

6. Apparatus as claimed in claim 5, in which the speed ratio of the worm gear is such that it is irreversible.

7. Apparatus as claimed in claim 6, in which the speed ratio of the worm gear is at least 6:1.

8. Apparatus as claimed in claim 1, in which each of said speed ratios is about 6:1.

9. Apparatus as claimed in claim 1, in which the control differential gear is mounted directly above the gears of the transmission differential gear in the same casing.

10. Apparatus as claimed in claim 9, in which the first and second connecting means are accommodated in said same casing.

11. In combination, a transmission and direction control means suitable for use with a vehicle having laterally spaced drive elements and adapted to transmit drive from a drive motor of the vehicle to the drive elements of the vehicle, comprising:

a transmission differential gear substantially on a longitudinal vertical line of the vehicle, and having an input which is drivingly connectable to the drive motor, and a pair of half shafts which are respectively drivingly connectable to the drive elements;

a control differential gear for effecting stable steering and resisting self steering and transferring power from one track to the other track, said control differential gear being substantially on said longitudinal vertical plane and compressing a cage, an input spur gear wheel fast with the cage, a pair of co-axial, outwardly extending, half shafts providing control half shafts, a pair of half shaft spur gear wheels respectively fast with said control half shafts at their inner ends, and at least a first pair of spur pinions mounted for rotation on the cage at circumferentially spaced positions on a pitch circle about the axis of the half shaft spur gear wheels, the pitch circle diameter corresponding to the sum of the effective diameters of the half shaft spur gear wheels and the spur pinions, the circumferential spacing corresponding to the sum of the effective radii of the spur pinions, the arrangement being such that the spur pinions mesh respectively with the half shaft spur gears, and with each other;

first connecting means interconnecting of the half shafts of each of the differential gear and the control differential gear for rotation in opposite directions and at a predetermined ratio of speed of the half shaft of the control differential gear to speed of the half shaft of the transmission differential fear larger than 1:1;

second connecting means connecting the other of the half shafts of each of the transmission differential gear and the control differential gear for rotation in the same direction and at a speed ratio similar to said predetermined speed ratio;

a control input drivingly connected to the input spur gear wheel; and control drive means adapted selectively to hold the control input stationary and to drive the control input in a desired direction and a desired speed.

12. Apparatus as claimed in claim 11, in which each spur pinion is rotatingly supported at either side thereof.

13. Apparatus as claimed in claim 12, in which each spur pinion is fast to or integral with a shaft via which it is rotatingly supported, the shaft being hollow.

14. Apparatus as claimed in claim 13, in which the shaft has an outer diameter only slightly less than a root diameter of the pinion.

15. Apparatus as claimed in claim 11, in which the control drive means is adapted for operation by means of incompressible hydraulic fluid, the control drive means including a hydraulic, axial piston, variable displacement pump having a pair of inlets/outlets, a hydraulic, axial piston motor having a pair of inlets/outlets respectively connected to the inlets/outlets of the pump, the pump having control means for adjusting the pump, the pump being drivingly connected to the drive motor and the hydraulic motor being drivingly connected to the control input, the pump being adapted for selective adjustment for delivery in a desired direction and at a desired output including zero delivery.

16. Apparatus as claimed in claim 15, further comprising a work gear for providing driving connection between the hydraulic motor and the control input.

17. Apparatus as claimed in claim 16, in which the speed ratio of the worm gear is such that it is irreversible.

18. Apparatus as claimed in claim 17, in which the speed ratio of the work gear is at least 6:1.

19. Apparatus as claimed in claim 11, in which each of said speed ratios is about 6:1.

20. Apparatus as claimed in claim 11, in which the control differential gear is mounted directly above the gears of the transmission differential gear in the same casing.

21. Apparatus as claimed in claim 20, in which the first and second connecting means are accommodated in said same casing.

* * * * *